US009959055B2

(12) United States Patent
Long

(10) Patent No.: US 9,959,055 B2
(45) Date of Patent: May 1, 2018

(54) PLACEMENT OF A PROCESSING UNIT IN UNFAIR LOCK MODE IN RESPONSE TO A QUEUE IN A FAIR LOCK MODE

(71) Applicant: Hewlett Packard Enterprise Development LP, Houston, TX (US)

(72) Inventor: Wai Man Long, Nashua, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 63 days.

(21) Appl. No.: 15/199,077

(22) Filed: Jun. 30, 2016

(65) Prior Publication Data
US 2018/0004411 A1 Jan. 4, 2018

(51) Int. Cl.
*G06F 3/06* (2006.01)
*G06F 12/14* (2006.01)
*G06F 9/52* (2006.01)
*G06F 9/455* (2018.01)

(52) U.S. Cl.
CPC ............ *G06F 3/061* (2013.01); *G06F 3/0637* (2013.01); *G06F 3/0665* (2013.01); *G06F 3/0673* (2013.01); *G06F 9/45558* (2013.01); *G06F 9/524* (2013.01); *G06F 12/145* (2013.01); *G06F 2009/4557* (2013.01); *G06F 2212/1016* (2013.01); *G06F 2212/152* (2013.01)

(58) Field of Classification Search
CPC ...... G06F 3/061; G06F 3/0637; G06F 3/0665; G06F 3/0673; G06F 9/45558; G06F 9/524
See application file for complete search history.

(56) References Cited

U.S. PATENT DOCUMENTS

| 2008/0177955 | A1* | 7/2008 | Su ....................... G06F 12/0828 711/154 |
| 2009/0328041 | A1* | 12/2009 | Sudzilouski ............ G06F 9/526 718/100 |
| 2011/0131192 | A1* | 6/2011 | Finnie ............... G06F 17/30362 707/704 |
| 2012/0089735 | A1* | 4/2012 | Attaluri ................... G06F 9/526 709/226 |
| 2013/0290967 | A1* | 10/2013 | Calciu ..................... G06F 9/526 718/102 |
| 2016/0139966 | A1* | 5/2016 | Greco ....................... G06F 9/52 718/106 |
| 2017/0039094 | A1* | 2/2017 | Dice ....................... G06F 9/526 |

OTHER PUBLICATIONS

Long, W, "[PATCH tip/locking/core v10 6/7] locking/pvqspinlock: Allow limited lock stealing", (Research Paper), LKML.org, Nov. 9, 2015, 5 pages.

* cited by examiner

*Primary Examiner* — Nimesh G Patel
(74) *Attorney, Agent, or Firm* — Hewlett Packard Enterprise Patent Department

(57) ABSTRACT

Examples herein disclose identification of a presence of a processing unit that is to obtain the lock within a queue in a fair lock mode. In response to the presence of the processing unit within the queue, the examples place a separate processing unit in an unfair lock mode.

14 Claims, 6 Drawing Sheets

PLACEMENT OF A PROCESSING UNIT IN UNFAIR LOCK MODE IN RESPONSE TO A QUEUE IN A FAIR LOCK MODE

BACKGROUND

A multi-core system uses multiple cores and/or multiple processors which each operate as independent processing unit. One example of a multiple core system is a virtualized system in which a host device may preempt one of the processing units.

BRIEF DESCRIPTION OF THE DRAWINGS

In the accompanying drawings, like numerals refer to like components or blocks. The following detailed description references the drawings, wherein.

DETAILED DESCRIPTION

Figure 1:
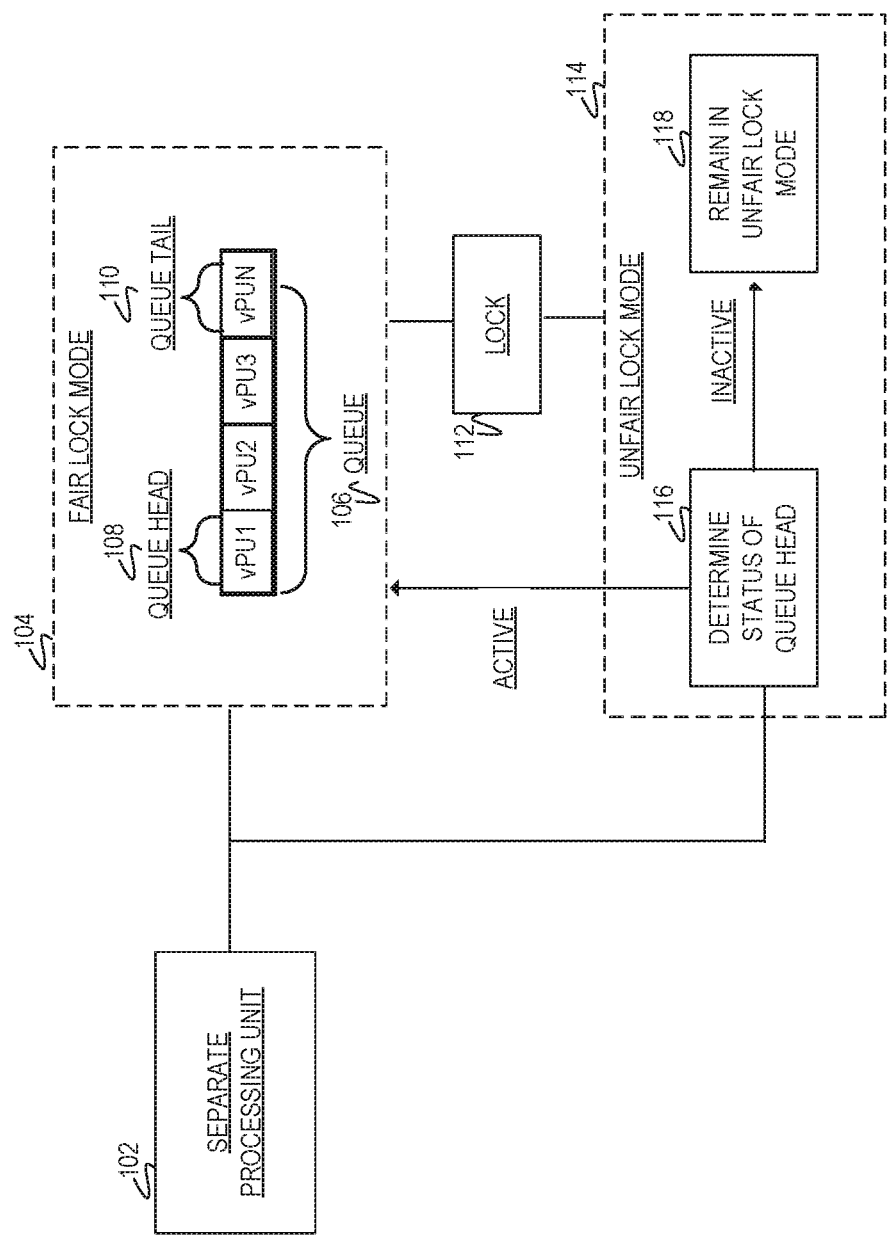
FIG. 1 is a block diagram of an example lock system including a queue operating in a fair lock mode and a separate processing unit to identify if the queue is populated with a processing unit prior to entering an unfair lock mode in accordance with the present disclosure.

During preemption, a host device may interrupt that processing unit for a given period of time with the intent of carrying out the interrupted task at a later time. An example of preemption may be a virtualization hypervisor (host device) stopping the virtual processing unit in a virtualized computing device and use the processing unit elsewhere. Another example may be an operating system kernel taking the processing unit away from a running application and give it to another application waiting for processing unit. This preemption may cause issues during locking.

Locking refers to a process for the processing unit to obtain a lock, such as a spinlock, for accessing a critical section of code. Obtaining the spinlock ensures the critical section of code is accessed by a single processing unit at a given time. The spinlock refers to a type of lock that causes a processing unit executing a thread to wait in a loop ("spin") to check if the lock is available. The processing unit executing the thread is in a busy-waiting mode for the lock availability; however during the busy-waiting mode, the processing unit may be unable to perform other tasks.

The increased number of preemptions or number of processing units attempting to obtain the spinlock may cause a degradation in the system performance. During preemption, the processing unit waiting for the lock may be unable to perform other tasks other than lock availability. For example, a processing unit may be accessing the lock and preempted by the host system. In this example, another processing unit may be waiting for the lock to become available. Thus the waiting time may become prolonged during which the waiting processing unit may be unable to complete other tasks which may degrade the overall system performance.

The types of spinlocks may include a fair spinlock mode and unfair spinlock mode. In the fair spinlock mode, a processing unit queues up to obtain the lock on a first-come first-serve basis; however the system performance may suffer with the increased number of processing units in the queue. In the unfair spinlock mode, each processing unit may poll the lock independently for the availability, however, lock starvation may be an issue as forward progress is not guaranteed for all the processing units. As such, each type of spinlock may include a different set of challenges.

To address these issues, examples disclosed herein provide a mechanism to combine these different types of spinlock to prevent system degradation during preemption. Combining both a fair and unfair spin lock mode allows a processing unit to take advantage of the benefits associated with each spinlock mode while minimizing the disadvantages. The examples identify if a queue operating in a fair lock mode is populated with a processing unit. In response to the queue being populated with the processing unit, a different processing unit may proceed to operate in an unfair lock mode. Identifying whether there may the populated queue prior to placement into the unfair lock mode, allows the different processing unit to make forward progress to acquire the lock.

The following detailed description refers to the accompanied figures. Wherever possible, the same reference numbers are used in the figures and the following description to refer to the same or similar parts. It is to be expressly understood, however, that the figures are for the purpose of illustration and description only. While several examples are described throughout, modification, adaptions, and other implementations are possible. Accordingly, the following detailed description is not meant to limit the disclosed examples, rather it is meant to provide proper scope of the disclosed examples and may be defined by the appended claims.

FIG. 1 illustrate an example lock system including separate processing unit 102 and queue 106 operating in fair lock mode 104. Separate processing unit 102 determines if queue 106 is populated with a processing unit to acquire lock 112. In response to the determination queue 106 is populated with the processing unit, separate processing unit 102 may enter unfair lock mode 114. At this point, separate processing unit 102 may determine a status of queue head 108 at module 116. If the status is active, separate processing unit 102 may proceed to enter fair lock mode 104. If the status is inactive, separate processing unit 102 may remain in unfair lock mode 114 at module 118. These statuses may be identified by a bit in lock 112 as set by queue head 108 when processing unit (vPU1) starts actively spinning on lock 112. The active status of queue 108 indicates the processing unit (vPU1) is spinning on lock 112 to acquire lock 112 once it becomes available. In active status, the processing unit (vPU1) within queue 106 is ready to acquire lock 112 and has not been preempted. The inactive status indicates processing unit (vPU1) has not yet started spinning for lock 112 to acquire. As such, this may indicate that processing unit (vPU1) may not be ready to acquire lock 112 and may have been preempted. In response to the populated queue and inactive queue head status, the separate processing unit 102 may remain in unfair lock mode 114 at module 118.

The lock system in FIG. 1 represents a virtualized environment of a multiple core system. As such, processing units in queue 106 including vPU1, vPU2, vPU3, vPUN, etc. and separate processing unit 102. Each of these processing units (vPU1, vPU2, vPU3, vPUN, and separate processing unit 102) may include a virtual component such as a virtualized processing component. As such, the term virtual processing unit(s) may be used interchangeably with the term processing unit(s) throughout this document. Implementations of processing unit(s) (vPU1, vPU2, vPU3, vPUN) and separate processing component 102 include a virtualized controller, software-defined networking controller, processing device, or other type of hardware, software executable by a host system, or combination thereof.

In fair lock mode 104, processing unit(s) may wait in queue 106 to acquire lock 112 once a lock holder releases lock 112. For example, a processing unit waits in queue 106 to acquire lock 112. In this example, each processing unit is placed in a first in first to acquire basis such that the processing unit(s) placed closer to queue head 108 acquire lock 112 prior to the processing unit(s) placed closer to queue tail 110. The term fair lock mode may be understood to indicate a fair spinlock and as such may be used interchangeably with the term fair spinlock throughout the document.

Queue 106 lists an order of which processing unit(s) are to acquire lock 112 on a first-come-first serve basis. As such, the processing unit (vPU1) located at queue head 108 acquires lock 112 prior to the processing unit (vPUN) located at tail queue 110. In this implementation, the processing unit listed first (vPU1) acquires lock 112 prior to other later listed processing units (vPU2, vPU3, vPUN). In this manner, those processing unit(s) that initially are placed in queue 106 receive lock 112 in a fair and equitable manner. Although FIG. 1 illustrates queue 106 as including multiple processing units (vPU1, vPU2, vPU3, vPUN) this was done for illustration purposes and not for limiting the disclosure. For example, queue 106 may be empty (e.g., absent of the processing unit(s)) at which point, separate processing unit 102 may be placed into queue 106 to wait for lock 112 availability in fair lock mode 104. The virtualized processing unit(s) (vPU1, vPU2, vPU3, vPUN) in fair lock mode 104 in queue 106, wait to acquire lock 112 once each virtualized processing unit becomes queue head 108. Queue head 108 represents the processing unit (vPU1) that is next to acquire lock 112 once the processing unit holding the lock 112, also referred to as "lock holder," releases lock 112. As explained earlier, the term virtualized processing unit may be used interchangeably with the term processing unit to indicate a physical processing unit, virtualized processing unit, or combination thereof.

Lock 112 is a data structure that allows a processing unit exclusive access to a portion of machine-readable instructions. Exclusive access may be provided to a portion of software, code, firmware, program, etc. that is considered critical. If multiple processing unit(s) access the portion, the data protected by the machine-readable instructions may become corrupt. Examples of the portion of machine-readable instructions includes a portion of an operating system, an application, or other type of machine-readable instructions. The processing unit that may have acquired lock 112 is referred to as a lock holder. The processing unit waiting for the availability of lock 112 is referred to as a lock waiter.

In unfair lock mode 114, a processing unit may operate to continuously poll lock 112 to determine when available. As such, the processing unit may "steal" lock 112 from queue 106. The term unfair lock mode may be understood to indicate an unfair spinlock and as such may be used interchangeably with the term unfair spinlock throughout the document.

At module 116 based on entering unfair lock mode 114, separate processing unit 102 may proceed to determine the status of queue head 108. In response to the determination of the active status of the queue head 108, separate processing unit 102 may transition from unfair lock mode 114 to fair lock mode 104 by placement into queue 106. In response to the determination of the inactive status of queue head 108, separate processing unit 102 may remain in unfair lock mode 114 at module 118. Implementations of module 116 may include, by way of example, instructions (e.g., stored on a machine-readable medium) that, when executed (e.g., by separate processing unit 102), implement the functionality of module 116. Alternatively, or in addition, module 116 may include electronic circuitry (i.e., hardware) that implements the functionality of module 116.

At module 118, in response to the determination queue 106 is populated and queue head 108 being inactive, separate processing unit 102 may remain in unfair lock mode 114. In a further implementation, separate processing unit 102 may transfer from unfair lock mode 114 to fair lock mode 104. In this implementation, a processing unit may transfer from unfair lock mode 114 to fair lock mode 104 via placement into queue 106 but may be unable to transfer from fair lock mode 104 to unfair lock mode 114. Implementations of module 118 may include, by way of example, instructions (e.g., stored on a machine-readable medium) that, when executed (e.g., by separate processing unit 102), implement the functionality of module 118. Alternatively, or in addition, module 118 may include electronic circuitry (i.e., hardware) that implements the functionality of module 118.

Figure 2:
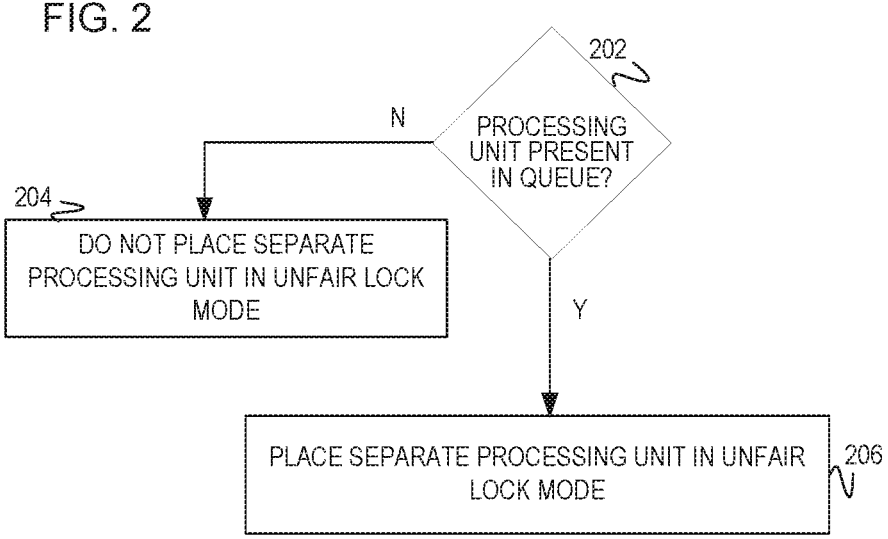
FIG. 2 is a flowchart of an example to determine whether a queue operating in a fair lock mode is populated with a processing unit and based on the determination to place a separate processing unit in an unfair lock mode in accordance with the present disclosure.
Figure 3:
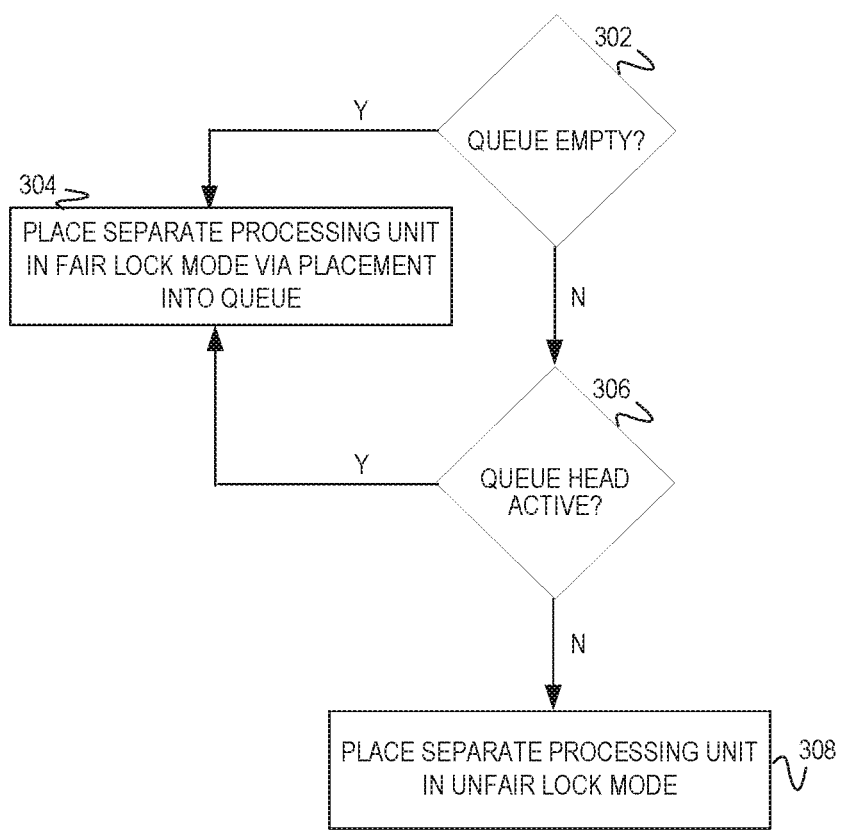
FIG. 3 is a flowchart of an example to determine whether a queue operating in a fair lock mode is populated with a processing unit and identify a status of a queue head for placing a separate processing unit in the fair lock mode or an unfair lock mode in accordance with the present disclosure.
Figure 4:
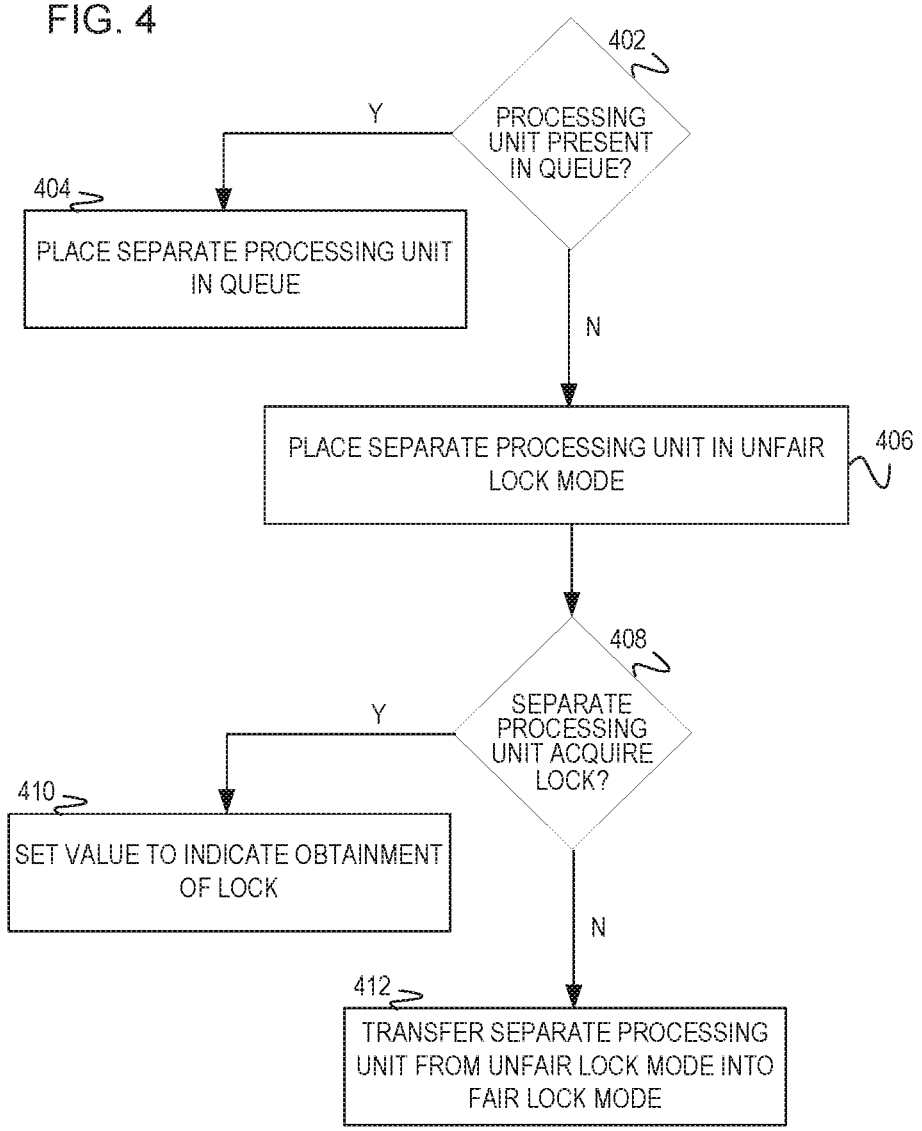
FIG. 4 is a flowchart of an example to place a separate processing unit in either a fair lock mode or unfair lock mode in accordance with the present disclosure.

Referring now to FIGS. 2-4, example flowcharts are illustrated in accordance with various examples of the present disclosure. The flowcharts represent processes that may be utilized in conjunction with various systems and devices as discussed with reference to the preceding figures. While illustrated in a particular order, the flowcharts are not intended to be so limited. Rather, it is expressly contemplated that various processes may occur in different orders and/or simultaneously with other processes than those illustrated.

FIG. 2 is a flowchart of an example method to detect if a queue operating in a fair lock mode is populated with a processing unit. The method may be executable by a processing unit to detect if the queue is populated with the processing unit and in turn place a separate processing unit in an unfair lock mode. In discussing FIG. 2, references may be made to the components in FIG. 1 to provide contextual examples. In one implementation, separate processing unit 102 executes operations 202-206 to detect an occupation of a queue in a fair lock mode and in turn, proceed to operate in an unfair lock mode. Although FIG. 2 is described as implemented by separate processing unit 102, it may be executable on other suitable hardware components. For example, FIG. 2 may be implemented in the form of executable instructions on a machine-readable storage medium 504 and 604 as in FIGS. 5-6.

At operation 202, the separate processing unit makes a determination if the queue is populated with the processing unit. The queue lists an order of which processing unit(s) are to acquire the lock on a first-come-first serve basis. In this example, the processing unit located at the queue head acquires the lock prior to the processing unit located at the queue tail. Alternatively at operation 202, the determination may include identifying if the queue is empty. In response to the identification that the queue is empty, the separate processing unit may be placed in the queue for operation in the fair lock mode. Based on identifying that the queue is populated, the separate processing unit may be placed in the unfair lock mode.

At operation 204 based on the determination that processing unit is absent from the queue, the separate processing unit may not be placed in the unfair lock mode. At this operation, the queue may be empty and as such, the separate processing unit is not placed in the unfair lock mode. As such, the separate processing unit may be placed in the fair lock mode via placement of the separate processing unit into the queue. Alternatively, the separate processing unit may be placed in the queue for operation in the fair lock mode. Identifying whether the queue is empty prior to placement ensures the separate processing unit makes progress to acquiring the lock.

At operation 206, in response to the determination that the queue is populated with the processing unit, the separate processing unit may be placed in the unfair lock mode. In the unfair lock mode, the separate processing unit may poll for the lock availability and may serve as a lock waiter. In a further implementation, upon determining that the queue is populated, a status of the queue head is identified. Based on whether the queue is populated and the queue head status, the separate processing unit may be placed in either the fair lock mode or the unfair lock mode. This implementation may be discussed in detail in a later figure.

FIG. 3 is a flowchart of an example method to identify if a queue is empty or populated with a processing unit. The queue lists an order of which processing units are to obtain a lock in a first-in-first out order. As such, the queue operates in a fair lock mode wherein lock acquisition is granted on a first-come, first-serve basis. In response to the determination that the queue is empty, a separate processing unit may be placed in the queue for operating in the fair lock mode. In response to the determination that the queue is populated with the processing unit, the method may proceed to confirm a status of the queue head. In response to a confirmation the queue head is in an active status and the queue populated with the processing unit, the separate processing unit is placed in the fair lock mode. In response to the queue head in an inactive status and the queue populated with the processing unit, the separate processing unit is placed into the unfair lock. At the unfair lock mode each processing unit in this mode polls the lock for acquisition and as such, the lock may be obtained by any one of the polling processing units. In this manner, the lock may be "stolen" away from the queue. Operating the separate processing unit between the fair lock mode and the unfair lock mode provides a hybrid locking mechanism that combines the advantages of the fair spinlock and the unfair spinlock while minimizing the draw backs. In discussing FIG. 3, references may be made to the components in FIG. 1 to provide contextual examples. In one implementation, separate processing unit 102 executes operations 302-306 to detect if the queue operating in the fair lock mode is populated with the processing unit and in turn, proceeding to operate in an unfair lock mode. Although FIG. 3 is described as implemented by separate processing unit 102, it may be executable on other suitable hardware components. For example, FIG. 3 may be implemented in the form of executable instructions on a machine-readable storage medium 504 and 604 as in FIGS. 5-6.

At operation 302, the presence of the processing unit within the queue is identified. If the processing unit is present, this indicates that the queue is populated with at least the processing unit. If the processing unit is not present, this indicates that the queue is empty and as such, the separate processing unit may be placed in the queue to acquire the lock in the fair lock mode. Operation 302 may be similar in functionality to operation 202 as in FIG. 2.

At operation 304, in response to the determination the queue is empty or absent of the processing unit presence, the separate processing unit is placed in the fair lock mode. Placing the separate processing unit in the fair lock mode includes positioning the separate processing unit in the queue so the separate processing unit may next acquire the lock. Upon the determination the queue is empty, this may indicate there are no other processing units in the queue. The empty queue means the separate processing unit is more likely to make forward progress and acquire the lock.

At operation 306, the separate processing unit confirms the status of the queue. The status of the queue head may include the active status or the inactive status. The active status indicates the processing unit is spinning on the lock and trying to acquire the lock once it becomes available. In the active status, the queue head may be spinning which indicates the processor at the queue head is ready to acquire the lock and has not been preempted by the host system. The inactive status indicates the processing unit may not have yet started spinning for the lock to acquire it. The inactive status indicates the processing unit may not be ready to acquire the lock and may have been preempted by the host system. The status is identified by a bit that is set in the lock by the queue head when the processing unit starts actively spinning the lock. A queue head that has been preempted by the host system allows the processing unit(s) in the unfair lock mode the opportunity to steal or acquire the lock. Thus, the separate processing unit may identify the bit that is set to represent the active status. Based on the confirmation of the active status of the queue head, the separate processing unit may proceed to operation 304 and operate in the fair lock mode. Based on the confirmation of the inactive status of the queue head, the separate processing unit may proceed to operation 308 and operates in the unfair lock mode.

At operation 308, the separate processing unit is placed in the unfair lock mode. In response to the determination that the queue is populated with the processing unit and the confirmation of the inactive status, the separate processing unit is placed in the unfair lock mode. In a further implementation, upon the separate processing unit operating in the unfair lock mode for a period of time, the separate processing unit may switch to fair lock mode via placement into the queue as at operation 304. In this implementation, the separate processing unit may transfer from the unfair lock mode to the fair lock mode; however, the separate processing unit may not transfer from the queue in the fair lock mode to the unfair lock mode. This implementation may be discussed in detail in a later figure. Operation 308 may be similar in functionality to operation 206 as in FIG. 2.

FIG. 4 is a flowchart of an example method to identify if a queue is populated with a processing unit. Upon identification of the populated queue, the method may place a separate processing unit in the unfair lock mode. The separate processing unit repeatedly checks the lock availability and queue active status until either the lock is available and acquired or the queue head becomes active. In the latter case, the separate processing unit is transferred to the unfair lock mode by placing it into the queue. In discussing FIG. 4, references may be made to the components in FIG. 1 to provide contextual examples. In one implementation, separate processing unit 102 executes operations 402-414 to detect if the queue operating in the fair lock mode is populated with the processing unit and in turn, proceeding to operate in an unfair lock mode. Although FIG. 4 is described as implemented by separate processing unit 102, it may be executable on other suitable hardware components. For example, FIG. 4 may be implemented in the form of executable instructions on a machine-readable storage medium 504 and 604 as in FIGS. 5-6.

At operation 402, the separate processing unit identifies the presence of the processing unit within the queue. The queue may either be populated with at least the processing unit or may be empty (e.g., absence of the processing unit). The queue lists an order of which processing unit(s) may obtain the lock in the fair lock mode. This means the queue lists the order of processing unit(s) that are to acquire the lock on a first-come-first serve basis. In response to the determination that the queue is empty, the separate processing unit may be placed into the queue for operation in the fair lock mode. In response to the determination that the queue is populated with at least the processing unit, the separate processing unit may proceed to additionally identify whether the queue head is in active status or inactive status as in FIG. 3. In response to the determination that queue is populated and the identification that the queue head is active, the separate processing unit may also be placed in the queue for operation in the fair lock mode. In response to the determination the queue is populated the queue head is inactive, the separate processing unit is placed in the unfair lock mode for acquiring the lock.

At operation 404, in response to the determination the queue is empty (e.g., not populated with any processing unit), the separate processing unit is placed in the fair lock mode by positioning the separate processing unit in the queue. Operation 404 may be similar in functionality to operation 204 and 304 as in FIGS. 3-4.

At operation 406, in response to the determination the queue is populated with the processing unit, the separate processing unit may proceed to operate in the unfair lock mode. In one implementation upon placing the separate processing unit in the unfair lock mode, the method may proceed to determine if the separate processing unit has acquired the lock. Upon the separate processing unit acquiring the lock, the separate processing unit sets the value, such as a bit, counter, etc. which indicates the lock is currently unavailable. In a further implementation, the separate processing unit may transfers from the unfair lock mode to the fair lock mode to make forward progress with acquiring the lock. Operation 406 may be similar in functionality to operation 206 and 306 as in FIGS. 2-3.

At operation 408 based on the determination of whether the separate processing unit has acquired the lock, the separate processing unit may set a value of the lock, such as a bit at operation 410 or proceed to transfer from the unfair lock mode into the fair lock mode as at operation 412.

At operation 410, upon acquiring the lock, the separate processing unit sets the value in the lock that indicates that the separate processing unit is the current lock holder. This bit may be set to indicate to other processing units the lock is currently unavailable.

At operation 412, if the separate processing unit has been unable to acquire the lock while operating in the unfair lock mode, the separate processing unit may transfer from the unfair lock mode to the fair lock mode. Transferring from the unfair lock mode to the fair lock mode ensures the separate processing unit makes forward progress to acquire the lock. In this implementation, the separate processing unit may be placed into the queue for operation in the fair lock mode. As such, the separate processing unit may transfer from the unfair lock mode to the queue, but once in the queue, the separate processing unit will be unable to transfer back to the unfair lock mode.

Figure 5:
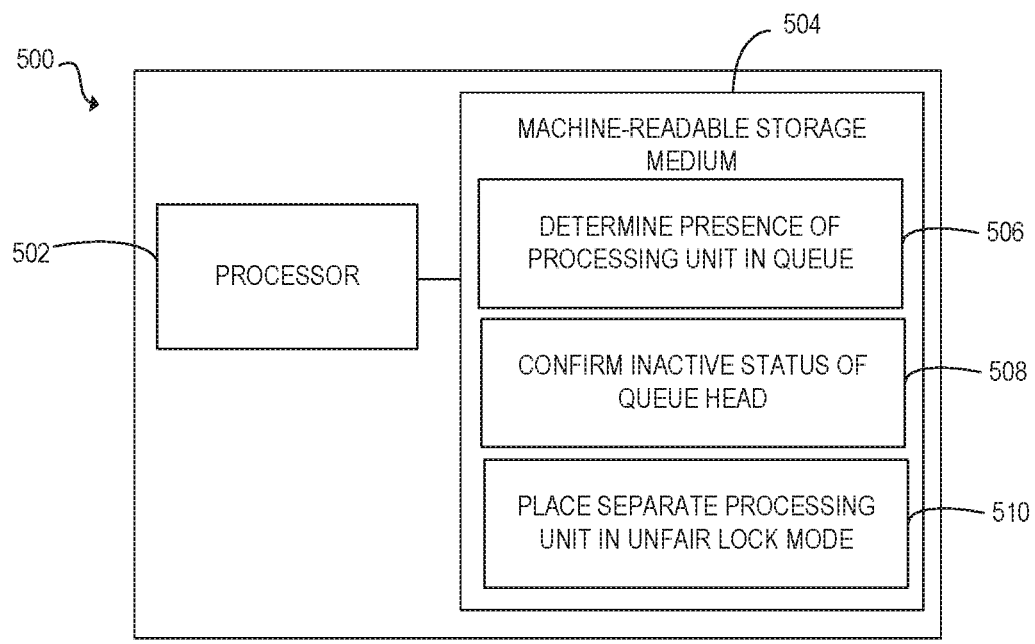
FIG. 5 is a block diagram of an example computing device with a controlling resource to execute instructions in a machine-readable storage medium for placing a separate processing unit in response to a populated queue and a status of a queue head in accordance with the present disclosure.

FIG. 5 is a block diagram of computing device 500 with a controller 502 to execute instructions 506-510 within a machine-readable storage medium 504. Although the computing device 500 includes processing resource 502 and machine-readable storage medium 504, it may also include other components that would be suitable to one skilled in the art. For example, the computing device 500 may include a controller, memory storage, or other suitable type of component. The computing device 500 is an electronic device with the processing resource 502 capable of executing instructions 506-510 and as such embodiments of the computing device 500 include a networking device, server, switch, router, mobile device, desktop computer, or other type of electronic device capable of executing instructions 506-510. The instructions 506-512 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 to determine if a queue is populated with a processing unit and in response to the population of the queue, placing a separate processing unit in an unfair lock mode. Specifically, the processing resource 502 executes instructions 506-510 to: determine if the queue is populated with the processing unit, the queue operates in a fair lock mode; confirm an inactive status of a queue head, the inactive status the queue head is not spinning; and in response to the determination the queue is populated with the processing unit and the confirmation status that the queue head is inactive, placing the separate processing unit in the unfair lock mode.

The machine-readable storage medium 504 includes instructions 506-510 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the computing device 500.

Figure 6:
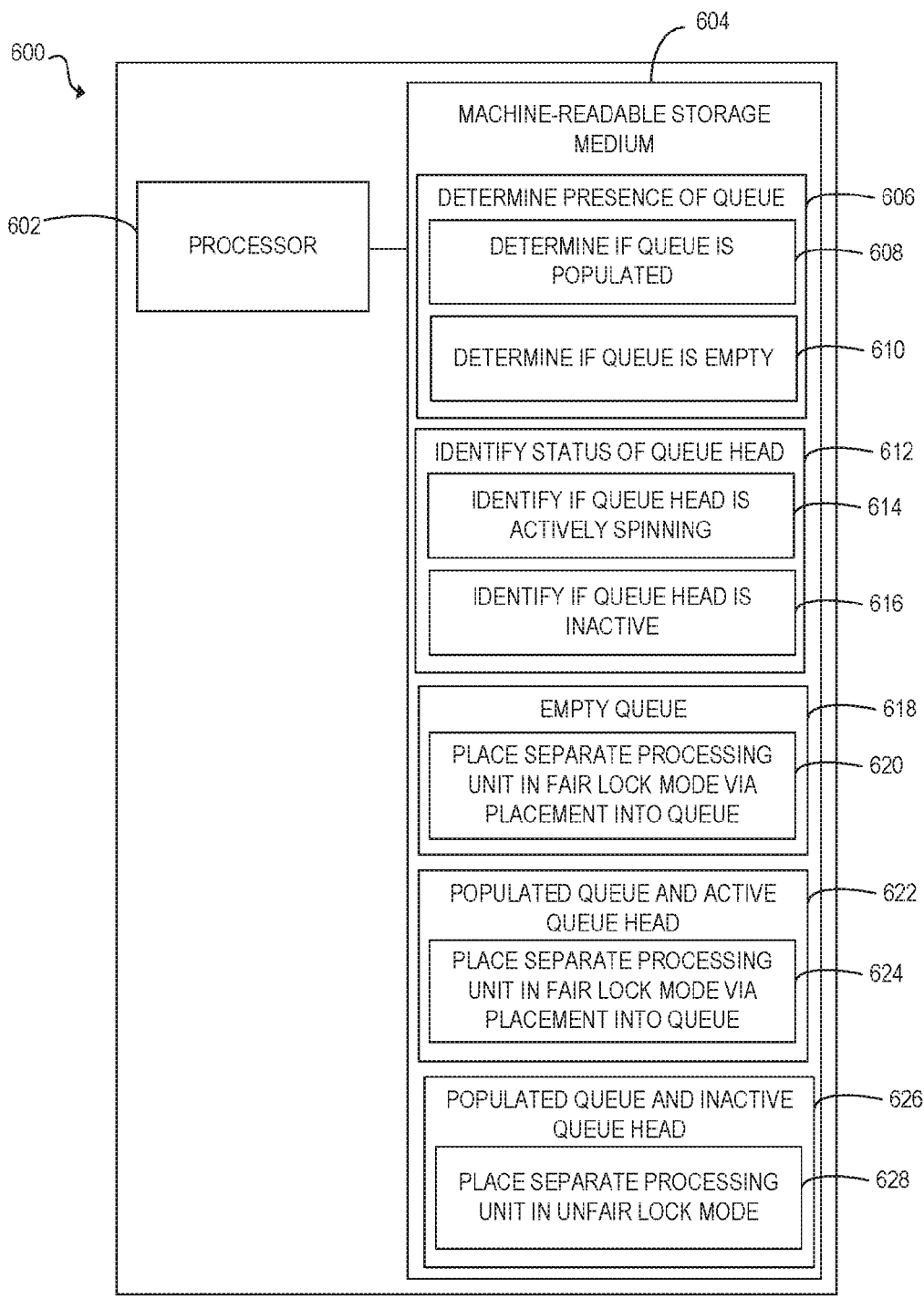
FIG. 6 is a block diagram of an example computing device with a controlling resource to execute instructions in a machine-readable storage medium for identifying a status of a queue head and determining whether a queue is populated for placing a separate processing unit in either a fair lock mode or unfair lock mode in accordance with the present disclosure.

FIG. 6 is a block diagram of computing device 600 with a processing resource 602 to execute instructions 606-628 within a machine-readable storage medium 604. Specifically, the computing device 600 with the processing resource 602 is to determine if a queue is populated and a status of a queue head. Based on the population of the queue and the status of the queue head, a separate processing unit is either placed in an unfair lock mode or fair lock mode via placement into the queue. Although the computing device 600 includes processing resource 602 and machine-readable storage medium 604, it may also include other components that would be suitable to one skilled in the art. For example, the computing device 600 may include a controller, memory storage, or other suitable type of component. The computing device 600 is an electronic device with the processing resource 602 capable of executing instructions 606-628 and as such embodiments of the computing device 600 include a networking device, server, switch, router, mobile device, desktop computer, laptop, or other type of electronic device capable of executing instructions 606-628. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-628 to place the separate processing unit in either the unfair lock mode or the fair lock mode. Specifically, the processing resource 602 executes instructions 606-628 to: determine a presence of a processing unit in the queue, such as if the queue is populated with the processing unit or if the queue is empty; identify an active or inactive status of a queue head; in response to the determination the queue is empty, placing the separate processing unit in the fair lock mode via placement of the separate processing unit in the queue to obtain the lock; in response to the determination the queue is populated with the processing unit and the active status of the queue head, placing the separate processing unit in the fair lock mode via placement into the queue; and in response to the determination the queue is populated and the inactive status of the queue head, keeping the separate processing unit in the unfair lock mode.

The machine-readable storage medium 604 includes instructions 606-628 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A method to obtain a lock, the method comprising:
identifying a presence of a processing unit that is to obtain the lock within a queue in a fair lock mode;
identifying the status of a queue head of the queue;
determining that the queue head is in an inactive status; and
in response to the presence of the processing unit within the queue and the queue head having the inactive status, placing a separate processing unit in an unfair lock mode.

2. The method of claim 1 comprising:
after usage by the separate processing unit of the lock, in response to an empty queue, placing a second separate processing unit in the queue in the fair lock mode.

3. The method of claim 1 comprising:
based on the identification of an active status of the queue head, proceeding to place a second separate processing unit in the queue.

4. The method of claim 1 comprising:
transferring the separate processing unit from the unfair lock mode to the fair lock mode via placement of the queue based on detection of an active status of the queue head.

5. The method of claim 1 wherein the fair lock mode and the unfair lock mode operate as spinlocks.

6. The method of claim 1 comprising:
acquiring the lock by the separate processing unit; and
setting a value in the lock by the separate processing unit to indicate the acquirement of the lock.

7. The method of claim 1 wherein the fair lock mode and the unfair lock mode operate in a virtualized environment.

8. A lock system comprising:
a queue to:
operate in a fair spinlock mode; and
list which processing unit is to obtain a lock;
a separate processing unit to:
determine a presence of a processing unit with the queue;
identify a status of a queue head of the queue; and
operate in an unfair spinlock mode in response to the presence of the processing unit within the queue and confirmation of an inactive status of the queue head.

9. The lock system of claim 8, wherein the separate processing unit:
based on a confirmation of an active status of the queue head and in response to the presence of the processing unit within the queue, operate in the fair spinlock mode.

10. A non-transitory machine-readable storage medium comprising instructions that when executed by a processing resource cause a computing device to:
determine a presence of a processing unit within a queue that is obtain a lock in a fair lock mode;

identify a status of a queue head; and in response to the presence of the processing unit within the queue and identification of an inactive status of the queue head, place a separate processing unit in an unfair lock mode.

11. The non-transitory machine-readable storage medium of claim 10 wherein to confirm the inactive state of the queue head comprises instructions that when executed by the processing resource cause the computing device to:

in response to the presence of the processing unit within the queue and identification of an active status of the queue head, place the separate processing unit in the queue in the fair lock mode.

12. The non-transitory machine-readable storage medium of claim 10 comprising instructions that when executed by the processing resource cause the computing device to:

in response to an empty queue and identification of an inactive status of the queue head, place the separate processing unit in the queue in the fair lock mode.

13. The non-transitory machine-readable storage medium of claim 10 comprising instructions that when executed by the processing resource cause the computing device to:

operate the fair lock mode and unfair lock mode within a virtualized environment.

14. The non-transitory machine-readable storage medium of claim 10 comprising instructions that when executed by the processing resource cause the computing device to:

transfer the separate processing unit from the unfair lock mode to the fair lock mode via placement of the separate processing unit in the queue.

* * * * *